US010189927B2

(12) United States Patent
Ino et al.

(10) Patent No.: US 10,189,927 B2
(45) Date of Patent: Jan. 29, 2019

(54) IONOMER HAVING HIGH OXYGEN PERMEABILITY

(71) Applicants: DAIKIN INDUSTRIES, LTD., Osaka-shi, Osaka (JP); ASAHI KASEI KABUSHIKI KAISHA, Tokyo (JP)

(72) Inventors: Tadashi Ino, Osaka (JP); Takashi Yoshimura, Osaka (JP); Masahiro Kondo, Osaka (JP); Naoto Miyake, Tokyo (JP); Yuichi Inoue, Tokyo (JP); Kuon Miyazaki, Tokyo (JP); Takahiro Tago, Tokyo (JP)

(73) Assignees: DAIKIN INDUSTRIES, LTD., Osaka (JP); ASAHI KASEI KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 15/313,779

(22) PCT Filed: May 27, 2015

(86) PCT No.: PCT/JP2015/065304
§ 371 (c)(1),
(2) Date: Nov. 23, 2016

(87) PCT Pub. No.: WO2015/182676
PCT Pub. Date: Dec. 3, 2015

(65) Prior Publication Data
US 2017/0183435 A1 Jun. 29, 2017

(30) Foreign Application Priority Data
May 28, 2014 (JP) ................. 2014-110454

(51) Int. Cl.
| | |
|---|---|
| *H01M 8/10* | (2016.01) |
| *C08F 214/26* | (2006.01) |
| *H01M 4/86* | (2006.01) |
| *H01M 8/1004* | (2016.01) |
| *H01M 8/1039* | (2016.01) |
| *H01M 8/1067* | (2016.01) |
| *H01B 1/06* | (2006.01) |
| *H01M 8/1018* | (2016.01) |

(52) U.S. Cl.
CPC ........ *C08F 214/262* (2013.01); *C08F 214/26* (2013.01); *H01M 4/86* (2013.01); *H01M 8/10* (2013.01); *H01M 8/1004* (2013.01); *H01M 8/1039* (2013.01); *H01M 8/1067* (2013.01); *H01B 1/06* (2013.01); *H01M 2008/1095* (2013.01); *H01M 2300/0082* (2013.01); *Y02P 70/56* (2015.11)

(58) Field of Classification Search
None
See application file for complete search history.

(56) References Cited

U.S. PATENT DOCUMENTS

| | | |
|---|---|---|
| 2002/0142207 A1 | 10/2002 | Watakabe et al. |
| 2008/0138686 A1 | 6/2008 | Kotera et al. |
| 2008/0193821 A1 | 8/2008 | Shimohira et al. |
| 2010/0009236 A1 | 1/2010 | Kotera et al. |
| 2011/0020728 A1 | 1/2011 | Kita et al. |
| 2013/0245219 A1 | 9/2013 | Perry et al. |
| 2015/0030962 A1 | 1/2015 | Hommura et al. |

FOREIGN PATENT DOCUMENTS

| | | |
|---|---|---|
| CN | 101542795 A | 9/2009 |
| CN | 101563802 A | 10/2009 |
| EP | 1 176 655 A1 | 1/2002 |
| EP | 2 109 171 A1 | 10/2009 |
| JP | 2000-188111 A | 7/2000 |
| JP | 2002-252001 A | 9/2002 |
| JP | 2002-260705 A | 9/2002 |
| JP | 2008-202039 A | 9/2008 |
| JP | 2011-065838 A | 3/2011 |
| JP | 2013-216811 A | 10/2013 |
| JP | 2014-500392 A | 1/2014 |
| WO | 2009/116446 A1 | 9/2009 |
| WO | 2013/157395 A1 | 10/2013 |

OTHER PUBLICATIONS

Communication dated Oct. 26, 2017 from the European Patent Office in counterpart Application No. 15799443.5.
International Preliminary Report on Patentability issued from the International Bureau in counterpart International Application No. PCT/JP2015/065304, dated Nov. 29, 2016.
International Search Report of PCT/JP2015/065304, dated Sep. 1, 2015 [PCT/ISA/210].

*Primary Examiner* — Wyatt P McConnell
(74) *Attorney, Agent, or Firm* — Sughrue Mion, PLLC

(57) ABSTRACT

The present invention aims to provide an ionomer that can exhibit high oxygen permeability, especially under both low- and high-humidified conditions, and high power generation durability. The high oxygen permeable ionomer includes a specific repeating unit A and repeating unit B and has an equivalent weight of 250 to 930 and a glass transition temperature of 100° C. to 130° C.

9 Claims, No Drawings

IONOMER HAVING HIGH OXYGEN PERMEABILITY

This is a National Stage of International Application No. PCT/JP2015/065304 filed May 27, 2015, claiming priority based on JP Patent Application No. 2014-110454 filed May 28, 2014, the contents of all of which are incorporated herein by reference in their entirety.

TECHNICAL FIELD

The present invention relates to a high oxygen permeable ionomer, an emulsion including the ionomer, an ionomer solution including the ionomer, an electrode catalyst layer, a membrane electrode assembly, and a fuel cell.

BACKGROUND ART

Membrane electrode assemblies (MEAs) constituting solid polymer electrolyte fuel cells include electrode catalyst layers including a catalyst such as platinum and an ionomer. Since the catalyst such as platinum is expensive, reduction in the amount thereof to be used is required. Unfortunately, the reduction in the amount of the catalyst tends to deteriorate the battery performance. In order to overcome this disadvantage, an attempt has been made to improve the oxygen permeability of an ionomer constituting an electrode catalyst layer delivering oxygen sufficiently in an electrode.

Patent Literature 1 discloses a polymer electrolyte having high oxygen permeability and suitable as an ionomer for a cathode-side catalyst layer. The polymer electrolyte includes an asymmetric hydrophobic cyclic structure and a hydrophilic structure that contains a proton-conducting group and that is bonded to the asymmetric cyclic structure, and is usable as an ionomer for a cathode-side catalyst layer.

Patent Literature 2 discloses a membrane electrode assembly for a solid polymer electrolyte fuel cell that achieves high power generation characteristics under high-temperature and low- or non-humidified operating conditions. The membrane electrode assembly includes a cathode-side catalyst layer that contains a polymer (H) as a solid polymer electrolyte polymer. The polymer (H) has an ion exchange capacity of 0.9 to 2.5 mEq/g (dry resin), an oxygen permeability coefficient of $1\times10^{-12}$ (cm$^3$ (Normal)·cm/cm$^2$·s·Pa) or more, which is measured at 100° C. by the high-vacuum method, and an oxygen/nitrogen separation factor of 2.5 or higher at 100° C. The polymer (H) contains a repeating unit (A) that includes a cyclic structure and no ion exchange group or precursor group thereof, and/or a repeating unit (B) that includes a cyclic structure and an ion exchange group or precursor group thereof, and the sum of the proportions of the repeating unit (A) and the repeating unit (B) is 20 mol % or more in all of the repeating units in the polymer (H).

Patent Literature 3 discloses a solid polymer electrolyte material excellent in ionic conductivity, water repellency, and gas permeability. The solid polymer electrolyte material contains a copolymer that contains a repeating unit based on a fluorine-containing monomer that gives a polymer having a main chain with an aliphatic ring structure by radical polymerization and a repeating unit based on a fluorine-containing vinyl compound represented by the formula: $CF_2=CF(R^2)_jSO_2X$.

Patent Literature 4 discloses a gas diffusion electrode excellent in electrode characteristics for oxygen reduction reaction. The gas diffusion electrode is a porous gas diffusion electrode with a catalyst layer containing a catalyst and a fluorine-containing ion exchange resin. The catalyst layer further contains a polymer compound having an oxygen permeability coefficient of $5\times10^{-11}$ [cm$^3$ (Normal)·cm/cm$^2$·s·Pa] or higher and containing substantially no ion exchange group. The polymer compound contains a polymer including a repeating unit based on a perfluorocarbon with an aliphatic ring structure.

Patent Literature 5 discloses ionically conductive compositions useful in fuel cells, electrolysis cells, ion exchange membranes, sensors, electrochemical capacitors, and modified electrodes. The ionically conductive compositions contain ionomers containing polymerized units of monomers A and monomers B, wherein the monomers A are perfluoro dioxole or perfluoro dioxolane monomers, and the monomers B are functionalized perfluoro olefins having fluoroalkyl sulfonyl, fluoroalkyl sulfonate or fluoroalkyl sulfonic acid pendant groups or $CF_2=CF(O)[CF_2]_nSO_2X$.

Patent Literature 6 discloses a solid polymer electrolyte fuel cell which includes gas diffusion electrodes containing a catalyst and an ion exchange resin and serving as a fuel electrode and an air electrode. The fuel electrode is disposed on one side of a film-like solid polymer electrolyte and the air electrode is disposed on the other side thereof. The ion exchange resin contained in the air electrode contains a copolymer containing a polymerized unit A, a polymerized unit B, and a polymerized unit C. The details of the polymerized unit s are: the polymerized unit A: a polymerized unit based on tetrafluoroethylene; the polymerized unit B: a polymerized unit based on perfluorovinyl ether containing a sulfonic acid group; and the polymerized unit C: a polymerized unit based on perfluorovinyl ether including no ion exchange group or precursor group hereof.

CITATION LIST

Patent Literature

Patent Literature 1: JP 2013-216811 A
Patent Literature 2: JP 2011-65838 A
Patent Literature 3: JP 2002-260705 A
Patent Literature 4: JP 2002-252001 A
Patent Literature 5: JP 2014-500392 T
Patent Literature 6: JP 2000-188111 A

SUMMARY OF INVENTION

Technical Problem

Unfortunately, the ionomers disclosed in Patent Literature documents 1 to 6 still have room for improvement in exhibiting high oxygen permeability under both low- and high-humidified conditions which are similar environments for actual operation of fuel cells and in exhibiting durability against frequent voltage variation for power generation (also referred to as "power generation durability" hereinafter), which is particularly required for automotive fuel cells.

In the above current situation in the art, the present invention aims to provide a high oxygen permeable ionomer (especially, exhibiting high oxygen permeability under both low- and high-humidified conditions) exhibiting high power generation durability.

Solution to Problem

The inventors conducted intensive studies for solving the above problems and found that a polymer that has a quite limited equivalent weight and glass transition temperature and includes a fluorovinyl ether repeating unit with no proton exchange group remarkably improves all of the oxygen permeability, power generation performance, and power generation durability. They have thus completed the present invention.

The present invention provides a high oxygen permeable ionomer, including:
a repeating unit A; and
a repeating unit B,
the ionomer having an equivalent weight of 250 to 930 and a glass transition temperature of 100° C. to 130° C., the repeating unit A being represented by the formula (1):

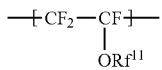

wherein $Rf^{11}$ represents a fluorinated hydrocarbon group having a carbon number of 1 or more and having no proton exchange group, and if the fluorinated hydrocarbon group has a carbon number of 2 or more, an oxygen atom may be inserted between two adjacent carbon atoms,
the repeating unit B being represented by the formula (2):

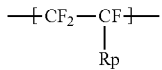

wherein Rp represents a monovalent group having a proton exchange group.

The repeating unit A is preferably at least one repeating unit selected from the group consisting of:
a repeating unit represented by the formula (3):

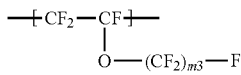

wherein $m^3$ represents an integer of 2 to 6; and
a repeating unit represented by the formula (4):

wherein $Y^{41}$ represents F or a C1-C3 perfluoroalkyl group; $k^4$ represents 0 or 1; $n^4$ represents an integer of 1 to 8; $Y^{41}$s the number of which is $n^4$ may be the same as or different from each other; and $m^4$ represents an integer of 1 to 6.

The repeating unit B is preferably represented by the formula (5):

wherein $Y^{51}$ represents F, Cl, or a C1-C3 perfluoroalkyl group; $k^5$ represents an integer of 0 to 2; $n^5$ represents an integer of 0 to 8; $Y^{51}$s the number of which is $n^5$ may be the same as or different from each other; $Y^{52}$ represents F or Cl; $m^5$ represents an integer of 2 to 6; $Y^{52}$s the number of which is $m^5$ may be the same as or different from each other; $Z^5$ represents H, an alkali metal, an alkaline-earth metal, or $NR^{51}R^{52}R^{53}R^{54}$; and $R^{51}$, $R^{52}$, $R^{53}$, and $R^{54}$ each independently represent a C1-C3 alkyl group or H.

The repeating unit B is preferably represented by the formula (6):

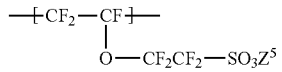

wherein $Z^5$ represents H, an alkali metal, an alkaline-earth metal, or $NR^{51}R^{52}R^{53}R^{54}$; and $R^{51}$, $R^{52}$, $R^{53}$, and $R^{54}$ each independently represent a C1-C3 alkyl group or H.

The high oxygen permeable ionomer preferably further includes a repeating unit C that is at least one repeating unit selected from the group consisting of:
a repeating unit represented by the formula (7):

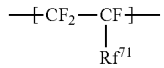

wherein $Rf^{71}$ represents F, Cl, or a C1-C9 linear or branched fluoroalkyl group, and
a repeating unit represented by the formula (8):

wherein $Y^{81}$ represents H or F; $Y^{82}$ represents F or a C1-C9 linear or branched fluoroalkyl group; and $Y^{83}$ represents H, F, Cl, or a C1-C9 linear or branched fluoroalkyl group.

The ionomer preferably contains 5 to 71 mol % of the repeating unit. A relative to all the repeating units.

The following are also aspects of the present invention: an emulsion including the high oxygen permeable ionomer and water, an ionomer solution including the high oxygen permeable ionomer and water, an electrode catalyst layer including the high oxygen permeable ionomer, a membrane electrode assembly including the electrode catalyst layer, and a fuel cell including the membrane electrode assembly.

Advantageous Effects of Invention

The high oxygen permeable ionomer of the present invention exhibits high oxygen permeability regardless of the presence or absence of acyclic structure in the main chain. Accordingly, the ionomer can be produced at low cost. Use of this ionomer for an electrode catalyst layer of a fuel cell can achieve a battery with high performance. Moreover, the amount of the catalyst used for the electrode catalyst layer can be reduced.

The membrane electrode assembly and the fuel cell of the present invention are excellent in power generation performance and power generation durability.

DESCRIPTION OF EMBODIMENTS

The present invention is specifically described in the following.

The high oxygen permeable ionomer has a glass transition temperature (Tg) of 100° C. to 130° C. The Tg of the ionomer is preferably 105° C. or higher, more preferably 110° C. or higher, while preferably 125° C. or lower, more preferably 120° C. or lower.

Although the reason is not obvious, if the Tg is equal to or higher than the above preferred lower limit, melting of the ionomer will be suppressed at expected operating temperatures of the resulting fuel cell, and the power generation durability will be improved. If the Tg is equal to or lower than the above preferred upper limit, loss of the motility of the ionomer will be prevented and high oxygen permeability will be maintained.

The glass transition temperature (Tg) can be measured using a dynamic viscoelasticity measuring device DVA-225, for example.

The high oxygen permeable ionomer has an equivalent weight EW (a dry mass (grams) of the perfluorocarbonsulfonic acid resin for one equivalent of the proton exchange group) of 250 to 930. The upper limit of the EW is preferably 910, more preferably 890. The lower limit of the EW is preferably 400, more preferably 450, still more preferably 500. If the EW falls within the above range, the processability will be further excellent, the conductivity of the electrode catalyst layer is not too low, and the solubility in hot water can be low.

The equivalent weight EW can be determined by the following method. A polymer electrolyte membrane (size: about 2 to 20 cm$^2$) containing an ion exchange group which has a counter ion in the form of proton is immersed in a saturated NaCl aqueous solution of 30 mL and the solution was stirred for 30 minutes at 25° C. Subsequently, the proton in the saturated NaCl aqueous solution is subjected to neutralization titration with a 0.01 N sodium hydroxide aqueous solution using phenolphthalein as an indicator. The neutralized polymer electrolyte membrane, in which the counter ion of the ion exchange group is a sodium ion, is rinsed with pure water, dried under reduced pressure, and weighed. The equivalent weight EN (g/eq) is determined from the following equation: EW=(W/M)−22, where M represents the amount (mmol) of sodium hydroxide used for the neutralization and W represents the weight (mg) of the polymer electrolyte membrane in which the counter ion of the ion exchange group is a sodium ion.

The high oxygen permeable ionomer includes a repeating unit. A and a repeating unit B.

The repeating unit A is represented by the formula (1):

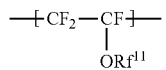

wherein $Rf^{11}$ represents a fluorinated hydrocarbon group having a carbon number of 1 or more and having no proton exchange group, and if the fluorinated hydrocarbon group has a carbon number of 2 or more, an oxygen atom may be inserted between two adjacent carbon atoms.

The repeating unit A includes no functional group commonly regarded as a proton exchange group, such as a group represented by —SO$_3$Z$^2$ (Z$^2$ represents H, an alkali metal, an alkaline-earth metal, or NR$^{21}$R$^{22}$R$^{23}$R$^{24}$, where R$^{21}$, R$^{22}$, R$^{23}$, and R$^{24}$ each independently represent a C1-C3 alkyl group or H.) and a group represented by —COOZ$^2$ (Z$^2$ represents H, an alkali metal, an alkaline-earth metal, or NR$^{21}$R$^{22}$R$^{23}$R$^{24}$, where R$^{21}$, R$^{22}$, R$^{23}$, and R$^{24}$ each independently represent a C1-C3 alkyl group or H).

The fluorinated hydrocarbon group is preferably an alkyl group with a carbon number of 2 or more, where an oxygen atom may be inserted between two adjacent carbon atoms. The carbon number of the alkyl group is preferably 2 to 8.

The repeating unit A is preferably at least one repeating unit selected from the group consisting of:

a repeating unit represented by the formula (3):

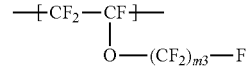

wherein m$^3$ represents an integer of 2 to 6; and
a repeating unit represented by the formula (4):

wherein $Y^{41}$ represents F or a C1-C3 perfluoroalkyl group; $k^4$ represents 0 or 1; $n^4$ represents an integer of 1 to 8; $Y^{41}$s the number of which is $n^4$ may be the same as or different from each other; and $m^4$ represents an integer of 1 to 6.

The repeating unit A represented by the formula (3) is preferably at least one selected from the group consisting of —CF$_2$—CF(—O—CF$_2$CF$_2$CF$_3$)—, —CF$_2$—CF(—O—CF$_2$CF$_2$CF$_2$CF$_3$)—, and —CF$_2$—CF(—O—CF$_2$CF$_3$)—, more preferably —CF$_2$—CF(—O—CF$_2$CF$_2$CF$_3$)—.

In the formula (4), $k^4$ is preferably 0; $Y^{41}$ is preferably F or a trifluoromethyl group; $n^4$ is preferably 1 or 2; and $m^4$ is preferably an integer of 1 to 3.

The repeating unit A is preferably —CF$_2$—CF(—O—CF$_2$CF$_2$CF$_3$)— among the above examples.

The repeating unit A has a molecular weight of preferably 180 to 1,000. The lower limit thereof is more preferably 190, still more preferably 210. The upper limit thereof is more preferably 900, still more preferably 700. If the molecular weight of the repeating unit A falls within the above range, the oxygen permeability tends to be still higher and the EW tends to be still smaller.

The high oxygen permeable ionomer further includes a repeating unit B. The repeating unit B is represented by the formula (2):

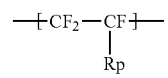

wherein Rp represents a monovalent group having a proton exchange group.

The proton exchange group is preferably —SO$_3$Z$^2$ (Z$^2$ represents H, an alkali metal, an alkaline-earth metal, or NR$^{21}$R$^{22}$R$^{23}$R$^{24}$, where R$^{21}$, R$^{22}$, R$^{23}$, and R$^{24}$ each independently represent a C1-C3 alkyl group or H).

The repeating unit B is preferably represented by t formula (5):

wherein $Y^{51}$ represents F, Cl, or a C1-C3 perfluoroalkyl group; $k^5$ represents an integer of 0 to 2; $n^5$ represents an integer of 0 to 8; $Y^{51}$s the number of which is $n^5$ may be the same as or different from each other; $Y^{52}$ represents F or Cl; $m^5$ represents an integer of 2 to 6; $Y^{52}$s the number of which is $m^5$ may be the same as or different from each other; $Z^5$ represents H, an alkali metal, an alkaline-earth metal, or $NR^{51}R^{52}R^{53}R^{54}$; and $R^{51}$, $R^{52}$, $R^{53}$, and $R^{54}$ each independently represent a C1-C3 alkyl group or H.

$Y^{51}$ is preferably F or a trifluoromethyl group; $k^5$ is preferably 0; $n^5$ is preferably 0 or 1, particularly preferably 0 in terms of excellent proton conductivity; $Y^{51}$ is preferably $CF_3$; $Y^{52}$ is preferably F; $m^5$ is preferably 2; and $Z^5$ is preferably H, Na, K, or $NH_4$.

The repeating unit B is more preferably represented by the formula (6):

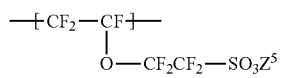

wherein $Z^5$ represents H, an alkali metal, an alkaline-earth metal, or $NR^{51}R^{52}R^{53}R^{54}$; $R^{51}$, $R^{52}$, $R^{53}$, and $R^{54}$ each independently represent a C1-C3 alkyl group or H; and $Z^5$ is preferably H, Na, K, or $NH_4$.

The high oxygen permeable ionomer preferably further includes a repeating unit C that is preferably at least one repeating unit selected from the group consisting of:

a repeating unit represented by the formula (7):

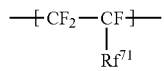

wherein $Rf^{71}$ represents F, Cl, or a C1-C9 linear or branched fluoroalkyl group, and a repeating unit represented by the formula (8):

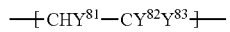

wherein $Y^{81}$ represents H or F; $Y^{82}$ represents F or a C1-C9 linear or branched fluoroalkyl group; and $Y^{83}$ represents H, F, Cl, or a C1-C9 linear or branched fluoroalkyl group.

$Rf^{71}$ is preferably F; $Y^{81}$ and $Y^{83}$ are both preferably H; $Y^{82}$ is preferably a linear fluoroalkyl group represented by $C_4F_9$ or $C_6F_{13}$.

The repeating unit C is preferably at least one selected from the group consisting of $-CF_2-CF_2-$, $-CF_2-CFCF_3-$, $-CF_2-CFCl-$, $-CH_2-CFH-$, $-CH_2-CF_2-$, $-CF_2-CFH-$, $-CH_2-C(CF_3)_2-$, and $-CH_2-CH(CF_2)_4F-$, more preferably at least one selected from the group consisting of $-CF_2-CF_2-$, $-CH_2-CF_2-$, $-CF_2-CFCl-$, $-CH_2-CFH-$, and $-CF_2-CFCF_3-$, still more preferably at least one selected from the group consisting of $-CF_2-CF_2-$, $-CF_2-CFCl-$, and $-CF_2-CFCF_3-$, particularly preferably at least one selected from the group consisting of $-CF_2-CF_2-$ and $-CF_2-CFCF_3-$, most preferably $-CF_2-CF_2-$.

The inventors found that an ionomer including the repeating unit A exhibits high oxygen permeability and that the ionomer shows good power generation characteristics when used for a cathode of a fuel cell.

In the high oxygen permeable ionomer of the present invention, the repeating unit A presumably greatly contributes to formation of diffusion paths of oxygen. The inventors found that a higher proportion of the repeating unit A achieves a higher oxygen permeability. This trend is more remarkable when the gas supplied into a fuel cell has a relatively lower humidity.

Meanwhile, in order to exhibit functions as an ionomer, it is important for the ionomer to contain an appropriate amount of the proton exchange group contained in the repeating unit B. For achieving this, the copolymerization proportion of the monomer B is preferably controlled to an appropriate value, which resultantly defines the upper limit of the copolymerization proportion of the monomer A.

The amount of the repeating unit A is preferably 5 to 71 mol %, more preferably 5.5 mol % or more, still more preferably 6.0 mol % or more, while more preferably 25 mol % or less, still more preferably 21 mol % or less, relative to all the repeating units.

The amount of the repeating it B is preferably 13 to 45 mol %, more preferably 14 mol % or more, still more preferably 16 mol % or more, whole more preferably 42 mol % or less, still more preferably 40 mol % or less, relative to all the repeating units.

The high oxygen permeable ionomer has a molar ratio (A/B) between the repeating unit A and the repeating unit B of preferably 0.1 to 5.0, more preferably 0.15 or more, still more preferably 0.2 or more, while more preferably 3.0 or less, still more preferably 2.5 or less. If the molar ratio is within the above range, sufficient proton conductivity and oxygen permeability can be achieved.

The amount of the repeating unit C is preferably 16 to 82 mol % relative to all the repeating units. The amount of the repeating unit C is more preferably 50 mol % or more, still more preferably 52 mol % or more, particularly preferably 54 mol % or more, while more preferably 80 mol % or less, still more preferably 78 mol % or less, relative to all the repeating units.

Each of the amounts (mol %) of the repeating units A to C in the high oxygen permeable ionomer can be determined by melt-state NMR.

The amounts (mol %) can be determined by calculation using the ratio of the intensities of the peak derived from $SO_2F$ around 45 ppm, the peaks derived from $-CF_3$ group and $-OCF_2-$ group around -80 ppm, and the peaks derived from $-CF_2-$ group and $-OCF(CF_3)-$ group around -120 ppm, which are shown on the spectrum of melt-state $^{19}$F-NMR.

The high oxygen permeable ionomer preferably has a molar ratio (A/B) between the repeating unit A and the repeating unit B of 0.1 to 5.0 and an equivalent weight (EW) of 250 to 930, more preferably a molar ratio (A/B) between the repeating unit A and the repeating unit B of 0.15 to 3.0 and an equivalent weight (EW) of 400 to 900, still more preferably a molar ratio (A/B) between the repeating unit A and the repeating unit B of 0.2 to 2.5 and an equivalent weight (EW) of 450 to 890.

The high oxygen permeable ionomer has a number average molecular weight of preferably 10,000 to 2,000,000 in order to achieve still better processability, electrical conductivity, and mechanical strength. The number average molecular weight is more preferably 30,000 to 1,000,000.

The number average molecular weight is a value determined by gel permeation chromatography (GPC) and can be calculated by the following process in terms of polystyrene standards, for example.

The number average molecular weight can be determined using HLC-8020 available from Tosoh, three columns (MIX columns made of polystyrene gel, GMH series available from Tosoh Corporation, size: 30 cm), and an NMP solvent (containing 5 mmol/L of LiBr), at 40° C. and a flow rate of 0.7 mL/min. The sample concentration may be 0.1% by weight, and the injection amount may be 500 µL. The number average molecular weight is still more preferably about 100,000 to 800,000, even more preferably about 130,000 to 700,000, particularly preferably about 160,000 to 600,000, in terms of polystyrene equivalent.

The high oxygen permeable ionomer has a melt flow rate (MFR) of preferably 0.1 to 1,000, more preferably 0.5 or more, still more preferably 1.0 or more, while more preferably 200 or less, still more preferably 100 or less, in order to achieve still better processability, electrical conductivity, and mechanical strength.

The MFR can be measured at a temperature of 270° C. and a load of 2.16 kg using Melt Indexer Type C-5059D (trade name, Toyo Seiki Co., Ltd.) according to ASTM standard D1238.

The high oxygen permeable ionomer of the present invention has an oxygen permeability coefficient (cc·cm/(cm²·sec·cmHg)) of preferably $3.0 \times 10^{-9}$ or more, more preferably $5.0 \times 10^{-9}$ or more, still more preferably $6.0 \times 10^{-9}$ or more, furthermore preferably $8.0 \times 10^{-9}$ or more, particularly preferably $1.0 \times 10^{-8}$ or more.

The oxygen permeability coefficient can be measured according to JIS K7126-2, ISO 15105-2. The oxygen permeability coefficient is the larger value of the value measured at 80° C. and 30% RH and the value measured at 80° C. and 90% RH.

The high oxygen permeable ionomer of the present invention preferably includes no cyclic structure in the main chain. Examples of the cyclic structure in the main chain include the following structures.

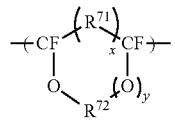

In the formula, x represents 0 or 1, y represents 0 or 1, $R^{71}$ represents an alkylene group with a carbon number of 1 or more. The alkylene group may be a fluoroalkylene group. If the alkylene group has a carbon number of 2 or more, it may be linear or branched. The upper limit of the carbon number is about 20. $R^{72}$ represents —$CF_2$— or —$CFR^{73}$— ($R^{73}$ represents a C1-C3 alkyl or fluoroalkyl group). The cyclic structure is usually a five- or six-membered ring.

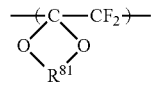

In the formula, $R^{81}$ represents an alkylene group with a carbon number of 1 or more. The alkylene group may be a fluoroalkylene group. If the alkylene group has a carbon number of 2 or more, it may be linear or branched. The upper limit of the carbon number is about 20. The cyclic structure is usually a five- or six-membered ring.

The ionomer may be prepared by a conventionally known method, such as bulk polymerization, solution polymerization, suspension polymerization, or emulsion polymerization. Among these, emulsion polymerization or solution polymerization is preferred.

Emulsion polymerization can provide the high oxygen permeable ionomer in the state of emulsion in which particles of the high oxygen permeable ionomer are dispersed in water.

In order to precisely control the composition of the polymer, the polymerization is preferably performed by continuously or dividedly supplying a fluoromonomer constituting the repeating unit A, a fluoromonomer constituting the repeating unit B, and a fluoromonomer constituting the repeating unit C in a pressure vessel.

If the fluoromonomer constituting the repeating unit C is a gaseous monomer, consumption of the monomer during the polymerization reaction decreases the pressure. Thus, the gaseous monomer is preferably supplied so as to maintain the pressure.

The fluoromonomer constituting the repeating unit A and the fluoromonomer constituting the repeating unit B, both being liquid, may be supplied according to the consumption of the fluoromonomer constituting the repeating unit C so as to achieve the desired polymer composition. The liquid monomers may be supplied by an appropriate method, such as injection using a pump or injection by pressurizing the monomer vessel. In order to facilitate the process, the fluoromonomer constituting the repeating unit A and the fluoromonomer constituting the repeating unit B are preferably mixed at a desired composition in advance.

Alternatively, the ionomer may be produced by a method including the steps of: radically polymerizing the fluoromonomer constituting the repeating unit A, a precursor monomer of the fluoromonomer constituting the repeating unit B, and the fluoromonomer constituting the repeating unit C in an aqueous medium to obtain an emulsion containing a precursor polymer; and hydrolyzing the precursor polymer by adding an alkali to the emulsion and thereby converting the precursor polymer into a high oxygen permeable ionomer to obtain an emulsion containing a high oxygen permeable ionomer. This method provides the high oxygen permeable ionomer in the state of emulsion in which particles of the high oxygen permeable ionomer are dispersed in water.

The precursor monomer of the fluoromonomer constituting the repeating unit B is preferably a fluoromonomer represented by the formula (9):

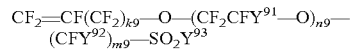

wherein $Y^{91}$ represents F, Cl, or a C1-C3 perfluoroalkyl group; $k^9$ represents an integer of 0 to 2, $n^9$ represents an integer of 0 to 8, $Y^{91}$s the number of which is $n^9$ may be the same as or different from each other; $Y^{92}$ represents F or Cl; $m^9$ represents an integer of 2 to 6; $Y^{92}$s the number of which is $m^9$ may be the same as or different from each other; and $Y^{93}$ represents a halogen atom.

$Y^{91}$ is preferably F or a trifluoromethyl group; $k^9$ is preferably 0; $n^9$ is preferably 0 or 1, particularly preferably 0; $Y^{92}$ is preferably F; $m^9$ is preferably an integer of 2 to 4, particularly preferably 2; and $Y^{93}$ is preferably F.

The precursor monomer is preferably a fluoromonomer represented by the formula (10):

wherein $Y^{93}$ represents a halogen atom, preferably F.

The alkali may be a NaOH or KOH aqueous solution
[0098]
The above aqueous medium is not particularly limited as long as it is liquid and includes water. Use of such an aqueous medium reduces environmental loads and cost and improves dispersion stability. The amount of water in the aqueous medium is preferably 10% by mass or more, more preferably 30% by mass or more, still more preferably 50% by mass or more, particularly preferably 90% by mass or more. Most preferably, the aqueous medium is substantially made of water.

The aqueous medium may contain substances such as fluorine-free organic solvents (e.g. alcohols, ethers, ketones) and fluorine-containing organic solvents having a boiling point of 40° C. or lower, in addition to water.

The radical polymerization may be performed in the presence of a surfactant. The surfactant is preferably a conventionally known fluorine-containing anion surfactant.

The radical polymerization is preferably started by adding a polymerization initiator. The polymerization initiator is not particularly limited as long as it can generate radicals at polymerization temperatures, and may be conventionally known oil-soluble and/or water-soluble polymerization initiator(s). A redox initiator may also be used. The concentration of the polymerization initiator is appropriately determined in accordance with the molecular weight of the target fluorine-containing copolymer and the reaction rate.

Examples of the polymerization initiator include persulfates such as ammonium persulfate and potassium persulfate, and organic peroxides such as disuccinic acid peroxide, diglutaric acid peroxide, and tert-butyl hydroperoxide. The redox initiator may be a combination of a persulfate or an organic peroxide with a reducing agent such as a sulfite (e.g. sodium sulfite), a bisulfite (e.g. sodium bisulfite), a bromate, a diimine, or an oxalic acid.

The radical polymerization may be performed under a pressure of 0.05 to 5.0 MPa. A preferred range of the pressure is 0.1 to 1.5 MPa. The radical polymerization may be performed at a temperature of 5° C. to 100° C. A preferred range of the temperature is 10° C. to 90° C. In the radical polymerization, conventionally known additives such as a stabilizer and a chain transfer agent may be used according to need.

Another aspect of the present invention is an emulsion that includes the high oxygen permeable ionomer, and water and/or an organic solvent. The emulsion can be suitably used as a material for forming an electrode catalyst layer of a fuel cell. The emulsion is preferably an emulsion for forming an electrode catalyst layer of a fuel cell.

The emulsion contains the high oxygen permeable ionomer in an amount of preferably 2 to 50% by mass, more preferably 5% by mass or more, still more preferably 10% by mass or more, while more preferably 40% by mass or less, still more preferably 30% by mass or less, particularly preferably 25% by mass or less.

Still another aspect of the present invention is an ionomer solution that includes the high oxygen permeable ionomer, and water and/or an organic solvent. The ionomer solution can be suitably used as a material for forming an electrode catalyst layer of a fuel cell. The ionomer solution is preferably an ionomer solution for forming an electrode catalyst layer of a fuel cell.

The ionomer solution contains the high oxygen permeable ionomer in an amount of preferably 2 to 50% by mass, more preferably 5% by mass or more, still more preferably 10% by mass or more, while more preferably 40% by mass or less, still more preferably 30% by mass or less, particularly preferably 25% by mass or less.

Examples of the organic solvent include protic organic solvents such as methanol, ethanol, n-propanol, isopropyl alcohol, butanol, and glycerin, and aprotic solvents such as N,N-dimethylformamide, N,N-dimethylacetamide, and N-methylpyrrolidone. These may be used alone or n combination of two or more thereof.

The ionomer solution may contain an organic additive. The ionomer solution may also contain an inorganic additive.

The organic additive may be a compound in which an atom in the structure tends to be easily abstracted by a radical. Examples of such a compound include those including a hydrogen atom bonded to a tertiary carbon atom and those including a carbon-halogen bond. Specific examples thereof include aromatic compounds partially replaced by the above functional group, such as polyaniline, and unsaturated heterocyclic compounds such as polybenzimidazole, polybenzoxazole, polybenzothiazole, polybenzoxadiazole, phenylated polyquinoxaline, and phenylated polyquinoline.

Thioether compounds may additionally be exemplified. Examples thereof include dialkyl thioethers such as dimethyl thioether, diethyl thioether, dipropyl thioether, methylethylthioether, and methylbutylthioether; cyclic thioethers such as tetrahydrothiophene and tetrahydroapyran; and aromatic thioethers such as methyl phenyl sulfide, ethyl phenyl sulfide, diphenyl sulfide, and dibenzyl sulfide.

Examples of the inorganic additive include metal oxides. Specific examples thereof include zirconia ($ZrO_2$), titania ($TiO_2$), silica ($SiO_2$), alumina ($Al_2O_3$), iron oxides ($Fe_2O_3$, FeO, $Fe_3O_4$), copper oxides (CuO, $Cu_2O$), zinc oxide (ZnO), yttrium oxide ($Y_2O_3$), niobium oxide ($Nb_2O_5$), molybdenum oxide ($MoO_3$), indium oxides ($In_2O_3$, $In_2O$), tin oxide ($SnO_2$), tantalum oxide ($Ta_2O_5$), tungsten oxides ($WO_3$, $W_2O_5$), lead oxides (PbO, $PbO_2$), bismuth oxide ($Bi_2O_3$), cerium oxides ($CeO_2$, $Ce_2O_3$), antimony oxides ($Sb_2O_3$, $Sb_2O_5$), germanium oxides ($GeO_2$, GeO), lanthanum oxide ($La_2O_3$), and ruthenium oxide ($RuO_2$). These metal oxides may be used alone or as mixtures thereof. For example, complex oxides such as indium tin oxide (ITO), antimony tin oxide (ATO), and aluminum zinc oxide ($ZnO.Al_2O_3$) may be used.

If the ionomer solution includes an organic solvent, the mass ratio between the organic solvent and water is preferably 10/90 to 90/10, more preferably 30/70 or higher, while more preferably 70/30 or less.

The high oxygen permeable ionomer can be suitably used as a material for forming a catalyst paste. The catalyst paste preferably contains the high oxygen permeable ionomer, a catalyst, and water and/or an organic solvent. The catalyst paste can be suitably used as a material for forming an electrode catalyst layer of a fuel cell. The catalyst paste is preferably a catalyst paste for forming an electrode catalyst layer of a fuel cell.

The catalyst is not particularly limited as long as it can be active in an electrode catalyst layer, and is appropriately selected according to use of the fuel cell including the electrode catalyst layer. The catalyst is preferably a catalyst metal.

The catalyst is preferably a metal that promotes the oxidation reaction of hydrogen and the reduction reaction of oxygen, more preferably at least one metal selected from the group consisting of platinum, gold, silver, palladium, iridium, rhodium, ruthenium, iron, cobalt, nickel, chromium, tungsten, manganese, vanadium, and alloys thereof, particularly preferably platinum. The particle size of the catalyst metal is not limited, but is preferably 10 to 1000 angstroms, more preferably 10 to 500 angstroms, most preferably 15 to 100 angstroms.

The catalyst paste contains the high oxygen permeable ionomer in an amount of preferably 5 to 30% by mass, more preferably 8% by mass or more, still more preferably 10% by mass or more, while more preferably 20% by mass or less, still more preferably 15% by mass or less, relative to the catalyst paste.

The catalyst paste contains the catalyst in an amount of preferably 50 to 200% by mass, more preferably 80% by mass or more, still more preferably 100% by mass or more, while more preferably 150% by mass or less, still more preferably 130% by mass or less, relative to the high oxygen permeable ionomer.

The catalyst paste preferably further contains a conductive agent. In a preferred embodiment, the catalyst and the conductive agent form composite particles (e.g. Pt-carrying carbon) in which the conductive agent carries particles of the catalyst this case, the high oxygen permeable ionomer also functions as a binder.

The conductive agent is not limited as long as it includes particles with conductivity (conductive particles), and is preferably at least one kind of conductive particles selected from the group consisting of carbon black (e.g. furnace black, channel black, acetylene black), activated carbon, graphite, and various metals (excluding the catalyst metal). These conductive agents have a particle size of preferably 10 angstroms to 10 μm, more preferably 50 angstroms to 1 μm, most preferably 100 angstroms to 5,000 angstroms.

The composite particles include catalyst particles in an amount of preferably 1 to 99% by mass, more preferably 10 to 90% by mass, most preferably 30 to 70% by mass, relative to the conductive particles. Specifically, suitable examples include Pt catalyst-carrying carbon such as TEC10E40E, TEC10E50E, and TEC10E50HT, all from Tanaka Kikinzoku Kogyo K. K.

The amount of the composite particles is preferably 1.0 to 3.0% by mass, more preferably 1.4 to 2.9% by mass, still more preferably 1.7 to 2.9% by mass, particularly preferably 1.7 to 2.3% by mass, relative to the high oxygen permeable ionomer.

The catalyst paste may further contain a water repellent.

The catalyst paste may further contain polytetrafluoroethylene (hereinafter, referred to as PTFE) for improved water repellency. In this case, PTFE may have any form as long as it is in a certain form, and is preferably in the form of particles or fibers. These forms may be employed alone or as mixtures thereof.

The amount of PTFE is preferably 0.01 to 30.0% by mass, more preferably 1.0 to 25.0% by mass, still more preferably 2.0 to 20.0% by mass, particularly preferably 5.0 to 10.0% by mass, relative to the high oxygen permeable ionomer.

The catalyst paste may further contain a metal oxide for improved hydrophilicity. The metal oxide is not particularly limited, and is preferably at least one metal oxide selected from the group consisting of $Al_2O_3$, $B_2O_3$, MgO, $SiO_2$, $SnO_2$, $TiO_2$, $V_2O_5$, $WO_3$, $Y_2O_3$, $ZrO_2$, $Zr_2O_3$, and $ZrSiO_4$. More preferred among these is at least one metal oxide selected from the group consisting of $Al_2O_3$, $SiO_2$, $TiO_2$, and $ZrO_2$, and particularly preferred is $SiO_2$.

The metal oxide may be in the form of particles or fibers, but particularly preferably has no particular form. The term no particular form as used herein means that even when the electrode catalyst layer is observed with an optical microscope or an electron microscope, no particles or fibers of the metal oxide are observed. Particularly, even when the electrode catalyst layer is observed with a scanning electron microscope (SEM) with a magnification of several hundred thousand times, no particles or fibers of the metal oxide are observed. Moreover, even when the electrode catalyst layer is observed with a transmission electron microscope (TEM) with a magnification of several hundred thousand times to several million times, no obvious particles or fibers of the metal oxide are observed. Thus, the term refers to the state that no particles or fibers of the metal oxide can be observed within the range of the current microscopic technology.

The amount of the metal oxide is preferably 0.01 to 100% by mass, more preferably 0.01 to 45% by mass, still more preferably 0.01 to 25% by mass, particularly preferably 0.5 to 6.0% by mass, relative to the high oxygen permeable ionomer.

Still another aspect of the present invention is an electrode catalyst layer including the high oxygen permeable ionomer. The electrode catalyst layer preferably includes the catalyst paste. The electrode catalyst layer can be produced at low cost and can achieve high oxygen permeability. The electrode catalyst layer can be suitably used for a fuel cell.

The electrode catalyst layer includes the high oxygen permeable ionomer and the catalyst. In the electrode catalyst layer, the amount of the high oxygen permeable ionomer supported relative to the electrode area is preferably 0.001 to 10 mg/cm$^2$, more preferably 0.01 to 5 mg/cm$^2$, still more preferably 0.1 to 1 mg/cm$^2$.

The electrode catalyst layer of the present invention preferably contains a high oxygen permeable ionomer, a catalyst, and a conductive agent. The electrode catalyst layer that includes a high oxygen permeable ionomer and composite particles (e.g. Pt-carrying carbon) that include catalyst particles and a conductive agent carrying the catalyst particles is one of preferred embodiments. In this case, the high oxygen permeable ionomer also functions as a binder.

The conductive agent is not limited as long as it includes particles with conductivity (conductive particles), and is preferably at least one kind of conductive particles selected from the group consisting of carbon black (e.g. furnace black, channel black, acetylene black), activated carbon, graphite, and various metals (excluding catalyst metal). These conductive agents have a particle size of preferably 10 angstroms to 10 μm, more preferably 50 angstroms to 1 μm, most preferably 100 angstroms to 5,000 angstroms.

The composite particles include catalyst particles in an amount of preferably 1 to 99% by mass, more preferably 10 to 90% by mass, most preferably 30 to 70% by mass, relative to the conductive particles. Specifically, suitable examples include Pt catalyst-carrying carbon such as TEC10E40E from Tanaka Kikinzoku Kogyo K. K.

The amount of the composite particles is preferably 20 to 95% by mass, more preferably 40 to 90% by mass, still more preferably 50 to 85% by mass, particularly preferably 60 to 80% by mass, relative to the total mass of the electrode catalyst layer. In the case where the electrode catalyst layer is used as an electrode catalyst layer of a fuel cell, the amount of the catalyst metal carried relative to the electrode area, which is determined after the electrode catalyst layer is formed, is preferably 0.001 to 10 mg/cm$^2$, more preferably 0.01 to 5 mg/cm$^2$, still more preferably 0.1 to 1 mg/cm$^2$. The electrode catalyst layer has a thickness of preferably 0.01 to 200 μm, more preferably 0.1 to 100 μm, most preferably 1 to 50 μm.

The electrode catalyst layer may optionally contain a water repellent.

The electrode catalyst layer may further contain polytetrafluoroethylene (hereinafter, referred to as PTFE) for improved water repellency. In this case, PTFE may have any form as long as it is in a certain form, and is preferably in the form of particles or fibers. These forms may be employed alone or in admixture. In the case where the electrode catalyst layer contains PTFE, the amount of PTFE is preferably 0.001 to 20% by mass, more preferably 0.01 to 10% by mass, most preferably 0.1 to 5% by mass, relative to the total mass of the electrode catalyst layer.

The electrode catalyst layer may further contain a metal oxide for improved hydrophilicity. In this case, the metal oxide is not particularly limited, and is preferably at least one metal oxide selected from the group consisting of $Al_2O_3$, $B_2O_3$, MgO, $SiO_2$, $SnO_2$, $TiO_2$, $V_2O_5$, $WO_3$, $Y_2O_3$, $ZrO_2$, $Zr_2O_3$, and $ZrSiO_4$. More preferred among these is at least one metal oxide selected from the group consisting of $Al_2O_3$, $SiO_2$, $TiO_2$, and $ZrO_2$, and particularly preferred is $SiO_2$.

The metal oxide may be in the form of particles or fibers, but particularly preferably has no particular form. The term no particular form as used herein means that even when the electrode catalyst layer is observed with an optical microscope or an electron microscope, no particles or fibers of the metal oxide are observed. Particularly, even when the electrode catalyst layer is observed with a scanning electron microscope (SEM) with a magnification of several hundred thousand times, no particles or fibers of the metal oxide are observed. Moreover, even when the electrode catalyst layer is observed with a transmission electron microscope (TEM) with a magnification of several hundred thousand times to several million times, no obvious particles or fibers of the metal oxide are observed. Thus, the term refers to the state that no particles or fibers of the metal oxide can be observed within the range of the current microscopic technology.

The amount of the metal oxide is preferably 0.001 to 20% by mass, more preferably 0.01 to 10% by mass, most preferably 0.1 to 5% by mass, relative to the total mass of the electrode catalyst layer.

The porosity of the electrode catalyst layer is not particularly limited, and is preferably 10 to 90% by volume, more preferably 20 to 80% by volume, most preferably 30 to 60% by volume.

The electrode catalyst layer may be suitably produced by a production method including the steps of:

radically polymerizing the fluoromonomer constituting the repeating unit A, the fluoromonomer constituting the repeating unit B, and the fluoromonomer constituting the repeating unit C in an aqueous medium to obtain an emulsion containing a high oxygen permeable ionomer;

dispersing a catalyst in the emulsion to prepare a catalyst paste;

coating a substrate with the catalyst paste; and drying the catalyst paste coating the substrate to obtain an electrode catalyst layer.

Also, the electrode catalyst layer may be suitably produced by a method including the steps of:

radically polymerizing the fluoromonomer constituting the repeating unit A, a precursor monomer of the fluoromonomer constituting the repeating unit B, and the fluoromonomer constituting the repeating unit C in an aqueous medium to obtain an emulsion containing the precursor polymer;

hydrolyzing the emulsion by adding an alkali to the emulsion and thereby converting the precursor polymer into a high oxygen permeable ionomer to obtain an emulsion containing a high oxygen permeable ionomer;

dispersing a catalyst in the emulsion to prepare catalyst paste;

coating a substrate with the catalyst paste; and drying the catalyst paste coating the substrate to obtain an electrode catalyst layer.

Also, the electrode catalyst layer may be suitably produced by a method including the steps of:

radically polymerizing the fluoromonomer constituting the repeating unit A, the fluoromonomer constituting the repeating unit B, and the fluoromonomer constituting the repeating unit C in an aqueous medium to obtain an emulsion containing a high oxygen permeable ionomer;

adding an organic solvent to the emulsion to obtain an ionomer solution in which the high oxygen permeable ionomer is dissolved;

dispersing a catalyst in the ionomer solution to prepare a catalyst paste;

coating a substrate with the catalyst paste; and drying the catalyst paste coating the substrate to obtain an electrode catalyst layer.

Also, the electrode catalyst layer may be suitably produced by a method including the steps of:

radically polymerizing the fluoromonomer constituting the repeating unit A, a precursor monomer of the fluoromonomer constituting the repeating unit B, and the fluoromonomer constituting the repeating unit C in an aqueous medium to obtain an emulsion containing the precursor polymer;

hydrolyzing the emulsion by adding an alkali to the emulsion and thereby converting the precursor polymer into a high oxygen permeable ionomer to obtain an emulsion containing a high oxygen permeable ionomer;

adding an organic solvent to the emulsion to obtain an ionomer solution in which the high oxygen permeable ionomer is dissolved;

dispersing a catalyst in the ionomer solution to prepare a catalyst paste;

coating a substrate with the catalyst paste; and drying the catalyst paste coating the substrate to obtain an electrode catalyst layer.

The precursor monomer of the fluoromonomer constituting the repeating unit B is preferably a fluoromonomer represented by the formula (9):

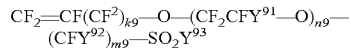

$$CF_2=CF(CF^2)_{k9}-O-(CF_2CFY^{91}-O)_{n9}-(CFY^{92})_{m9}-SO_2Y^{93}$$

wherein $Y^{91}$ represents F, Cl, or a C1-C3 perfluoroalkyl group; $k^9$ represents an integer of 0 to 2, $n^9$ represents an integer of 0 to 8, $Y^{91}$s the number of which is $n^9$ may be the same as or different from each other; $Y^{92}$ represents F or Cl; $m^9$ represents an integer of 2 to 6; $Y^{92}$s the number of which is $m^9$ may be the same as or different from each other; and $Y^{93}$ represents a halogen atom.

$Y^{91}$ is preferably F or a trifluoromethyl group; $k^9$ is preferably 0; $n^9$ is preferably 0 or 1, particularly preferably 0; $Y^{92}$ is preferably F; $m^9$ is preferably an integer of 2 to 4, particularly preferably 2; and $Y^{93}$ is preferably F.

The precursor monomer is preferably a fluoromonomer represented by the formula (10):

$$CF_2=CF-O-CF_2CF_2-SO_2Y^{93}$$

wherein $Y^{93}$ represents a halogen atom, preferably F.

The alkali may be a NaOH or KOH aqueous solution.

The above aqueous medium is not particularly limited as long as it is liquid and includes water. Use of such an aqueous medium reduces environmental loads and cost and improves dispersion stability. The amount of water in the aqueous medium is preferably 10% by mass or more, more preferably 30% by mass or more, still more preferably 50% by mass or more, particularly preferably 90% by mass or more. Most preferably, the aqueous medium is substantially made of water.

The aqueous medium may contain substances such as fluorine-free organic solvents (e.g. alcohols, ethers, ketones) and fluorine-containing organic solvents having a boiling point of 40° C. or lower, in addition to water.

The radical polymerization may be performed in the presence of a surfactant. The surfactant is preferably a conventionally known fluorine-containing anion surfactant.

The radical polymerization is preferably performed with addition of a polymerization initiator. The polymerization initiator is not particularly limited as long as it can generate radicals at polymerization temperatures, and may be conventionally known oil-soluble and/or water-soluble polymerization initiator(s). A redox initiator may also be used. The concentration of the polymerization initiator is appropriately determined in accordance with the molecular weight and the reaction rate of the target fluorine-containing copolymer.

Examples of the polymerization initiator include persulfates such as ammonium persulfate and potassium persulfate, organic peroxides such as disuccinic acid peroxide, diglutaric acid peroxide, and tert-butyl hydroperoxide. The redox initiator may be one prepared by combining a persulfate or an organic peroxide with a reducing agent such as a sulfite (e.g. sodium sulfite), a bisulfite (e.g. sodium bisulfite), a bromate, a diimine, or an oxalic acid.

The radical polymerization may be performed under a pressure of 0.05 to 5.0 MPa. A preferred range of the pressure is 1.5 to 3.0 MPa. The radical polymerization may be performed at a temperature of 10° C. to 100° C. A preferred range of the temperature is 50° C. to 90° C. In the radical polymerization, conventionally known additives such as a stabilizer and a chain transfer agent may be used according to need.

Examples of the organic solvent include protic organic solvents such as methanol, ethanol, n-propanol, isopropyl alcohol, butanol, and glycerin, and aprotic solvents such as N,N-dimethylformamide, N,N-dimethylacetamide, and N-methylpyrrolidone. These may be used alone or in combination of two or more thereof.

The dissolution method is not particularly limited and an example thereof is described below. First, a solvent mixture including water and a protic organic solvent is added to the emulsion under the conditions where the total solids concentration is 1 to 50% by mass. Next, this composition is fed into an autoclave optionally equipped with a glass inner tube, and the inside air is purged with an inert gas such as nitrogen. The composition is then heated and stirred for 1 to 12 hours at an internal temperature of 50° C. to 250° C., whereby an ionomer solution is obtained. The process for obtaining the ionomer solution preferably includes the steps of adding an organic solvent to the obtained emulsion and heating the emulsion to obtain an ionomer solution in which a high oxygen permeable ionomer is dissolved. Although the total solids concentration is preferred to be high for better yield, too high a concentration may cause undissolved matters. The total solids concentration is thus preferably 1 to 50% by mass, more preferably 3 to 40% by mass, still more preferably 5 to 30% by mass.

In the case of a protic organic solvent, the composition ratio between water and a protic organic solvent contained in the resulting ionomer solution may be appropriately adjusted according to factors such as the dissolution method, the conditions for dissolution, the kind of polymer electrolyte, the total solids concentration, the temperature for dissolution, and the stirring speed. The amount of the protic organic solvent is preferably 10 to 1,000 parts by mass, particularly preferably 10 to 500 parts by mass, relative to 100 parts by mass of water.

The ionomer solution may contain one or two or more of emulsion (a liquid in which liquid particles are dispersed as colloidal particles or coarser particles to form emulsion), suspension (a liquid in which solid particles are dispersed as colloidal particles or particles with sizes recognizable with a microscope), colloidal liquid (a liquid in which macromolecules are dispersed), and micellar liquid (a lyophilic colloid dispersion system in which a large number of small molecules are associated by intermolecular forces).

The ionomer solution is condensable. The condensation method is not particularly limited. Examples thereof include heating the solution to evaporate the solvent and concentrating the solution under reduced pressure. The solids content of the resulting coating solution is preferably 0.5 to 50% by mass in consideration of handling characteristics and productivity.

The ionomer solution is more preferably filtered in order to remove coarse particles. Any conventionally used method may be employed for the filtration. Typical examples thereof include pressure filtration using a commonly used filter made of a filter medium with rated filtration accuracy. The filter to be used is preferably made of a filter medium whose 90% collection particle size is 10 to 100 times the average particle size of the particles. The filter medium may be a filter paper or a filter medium such as a sintered metal filter. Particularly in the case of a filter paper, the 90% collection particle size is preferably 10 to 50 times the average particle size of the particles. In the case of a sintered metal filter, the 90% collection particle size is preferably 50 to 100 times the average particle size of the particles. Adjusting the 90% collection particle size to ten or more times the average particle size can suppress an excessive increase in pressure required for liquid delivery and short-time clogging of the filter. Meanwhile, adjusting the 90% collection particle size to 100 or less times the average particle size is preferred in order to favorably remove aggregates of particles and undissolved resin that would be contained in the resultant film as impurities.

The above production method includes the steps of: dispersing the catalyst in the resulting emulsion or ionomer solution to prepare a catalyst paste, coating a substrate with the catalyst paste, and drying the catalyst paste coating the substrate to obtain an electrode catalyst layer.

The step of dispersing the catalyst in the resulting emulsion or ionomer solution to prepare a catalyst paste is preferably a step of dispersing composite particles that include catalyst particles and a conductive agent carrying the catalyst particles in the resulting emulsion or ionomer solution to prepare a catalyst paste.

Coating a substrate with the catalyst paste may be performed by a commonly known method such as screen printing or spraying.

The production method may further include a step of immersing the resulting electrode catalyst layer in an inorganic acid such as hydrochloric acid. The temperature for the acid treatment is preferably 5° C. to 90° C., more preferably 10° C. to 70° C., most preferably 20° C. to 50° C.

Still another aspect of the present invention is a membrane electrode assembly (hereinafter, also referred to as an "MEA") including the electrode catalyst layer. The membrane electrode assembly of the present invention, which includes the electrode catalyst layer, is excellent in battery performance, mechanical strength, and stability. The membrane electrode assembly can be suitably used for a fuel cell.

A unit in which two electrode catalyst layers, i.e., an anode and a cathode, are bonded to the respective sides of an electrolyte membrane is referred to as a membrane electrode assembly (hereinafter, also referred to as an "MEA"). A unit in which a pair of gas diffusion layers is oppositely bonded to the respective outer sides of the electrode catalyst layers may also be referred to as an MEA. The electrode catalyst layers need to have proton conductivity.

The electrode catalyst layer as an anode involves a catalyst that easily oxidizes a fuel (e.g. hydrogen) to produce protons. The electrode catalyst layer as a cathode involves a catalyst that reacts protons and electrons with an oxidizer (e.g. oxygen, air) to produce water. Both of the anode and cathode may suitably use the above mentioned catalyst metal as a catalyst.

The gas diffusion layer may be commercially available carbon cloth or carbon paper. Typical examples of the former include carbon cloth E-tek and B-1 available from De Nora North America of the United States. Typical examples of the latter include CARBEL (trademark, Japan Gore-Tex), TGP-H (Toray Industries, Inc.), and carbon paper 2050 (Spectracorp, Inc.).

A structure in which an electrode catalyst layer and a gas diffusion layer are integrated is called a "gas diffusion electrode". An MEA can also be obtained by bonding a gas diffusion electrode to an electrolyte membrane. Typical examples of a commercially available gas diffusion electrode include a gas diffusion electrode ELAT (trademark) (using carbon cloth as a gas diffusion layer) available from De Nora North America of the United States.

An MEA can be formed by, for example, sandwiching an electrolyte membrane between electrode catalyst layers and bonding them by heat press. More specifically, an MEA may be formed as follows. The high oxygen permeable ionomer is dispersed or dissolved in a mixed solution of an alcohol and water. Then, a commercially available platinum-carrying carbon (e.g. TEC10E40E available from Tanaka Kikinzoku Kogyo K. K.) as a catalyst is dispersed in the resulting dispersion/solution to prepare a paste. Each of two PTFE sheets on one side is coated with this paste in a certain amount, and the paste is dried to form electrode catalyst layers. Subsequently, the coated sides of the PTFE sheets are faced to each other, and an electrolyte membrane is sandwiched between the PTFE sheets. The workpiece is subjected to transfer bonding under heat pressing at 100° C. to 200° C. The PTFE sheets are then removed, and thereby an MEA can be obtained. The method for forming an MEA is wellknown to a person skilled in the art. The method for forming an MEA is specifically described in JOURNAL OF APPLIED ELECTROCHEMISTRY, 22 (1992) pp. 1 to 7, for example.

The MEA (including an MEA that includes a pair of gas diffusion electrodes facing to each other) is further assembled with components used for a common fuel cell, such as a bipolar plate and a backing plate, to build a fuel cell.

Still another aspect of the present invention is a fuel cell including the membrane electrode assembly. The fuel cell is preferably a solid polymer electrolyte fuel cell. The fuel cell of the present invention is not particularly limited as long as it includes the membrane electrode assembly, and may usually include components constituting a fuel cell, such as gas. The fuel cell of the present invention, including the membrane electrode assembly with the electrode catalyst layers, is excellent in battery performance, mechanical strength, and stability.

The bipolar plate refers to a composite material of graphite and resin or a metal plate each, of which is provided with grooves for flowing gases such as fuel and an oxidizer on the surface. The function of the bipolar plate is to supply fuel and an oxidizer to the vicinity of the electrode catalyst as a flow path as well as to transmit electrons to the external load circuit. An MEA is inserted between such bipolar plates, and the resulting laminates are stacked to produce a fuel cell.

EXAMPLES

The present invention is described referring to, but not limited to, examples below.

The values obtained in the examples were determined according to the following.
(EW Measurement)

A polymer electrolyte membrane (size: about 2 to 20 cm$^2$) containing an ion exchange group which had a proton as a counter ion was immersed in 30 mL of a saturated NaCl aqueous solution, and the solution was stirred for 30 minutes at 25° C. Subsequently, the proton in the saturated NaCl aqueous solution was subjected to neutralization titration with a 0.01 N sodium hydroxide aqueous solution using phenolphthalein as an indicator. The neutralized polymer electrolyte membrane, in which the counter ion of the ion exchange group was a sodium ion, was rinsed with pure water, dried under reduced pressure, and weighed. The equivalent weight EW (g/eq) was determined from the following equation, where M represents the amount (mmol) of sodium hydroxide used for the neutralization and W represents the weight (mg) of the polymer electrolyte membrane in which the counter ion of the ion exchange group is a sodium ion:

$$EW=(W/M)-22.$$

(Measurement of Melt Flow Rate (MFR))

The MFR of the precursor polymer was measured under the conditions of a temperature of 270° C. and a load of 2.16 kg, using Melt Indexer Type C-5059D (trade name, Toyo Seiki Co., Ltd.) according to ASTM standard D1238. The mass of the extruded precursor was expressed in g/10 min as the unit of MFR.
(Measurement of Glass Transition Temperature (Tg))

The glass transition point (Tg) of a membrane sample was measured with a dynamic viscoelasticity measuring device DVA-225. The sample had a size of a grasp length of 20 mm and a width of 5 mm. The temperature profile used was heating from room temperature to 300° C. at 5° C./min. The measured α-dispersion temperature was taken as a glass transition temperature (Tg).
(Oxygen Permeability Coefficient)

The gas permeability coefficient for oxygen of the membrane sample was measured with a flow-type gas permeability measuring device GTR-30XFAFC available from GTR Tec Corporation. The flow rate of gas supplied was set to 30 cc/min for test gas (oxygen) and 100 kPa for carrier gas (He). The conditions for heating and humidifying the gas were 80° C. 30% RH and 80° C. 90% RH.

The oxygen gas transmitted through the membrane sample from the test gas side to the flow side was introduced into a gas chromatograph G2700TF available from Yanaco Analytical Systems Inc. to quantify the gas permeation amount.

The gas permeability coefficient P (cc·cm/(cm$^2$·sec·cmHg)) is determined from the following equation: P=(X×k×T/(A×D×p)), where X represents the permeation amount (cc), k represents the correction factor (=1.0), T represents the thickness (cm) of the membrane sample, A represents the permeation area (cm$^2$), D represents the metering tube passing time (sec), and p represents the oxygen partial pressure (cmHg).

(Catalyst Paste Preparation, Electrode Formation, Fuel Cell Evaluation)

In order to evaluate the performance of an MEA under high-temperature and low-humidified conditions, a power generation test was carried out according to the following procedures.

(1) Preparation of Electrode Catalyst Ink

An ionomer solution with a solids concentration of 20% by mass and an electrode catalyst (TEC10E40E, Tanaka Kikinzoku Kogyo K. K., amount of platinum carried: 36.7% by weight) were blended at a ratio (by weight) of platinum/perfluoro sulfonic acid polymer of 1/1.15. Then, ethanol was added thereto such that the solids content (the sum of the electrode catalyst and the perfluoro sulfonic acid polymer) was 11% by weight, and the resulting solution was stirred with a homogenizer (As One Corporation) at a rotational speed of 3000 rpm for 10 minutes, whereby an electrode catalyst ink was obtained.

(2) Formation of MEA

Using an automatic screen printing machine (trade name: LS-150, Newlong Seimitsu Kogyo Co., Ltd.), each side of a polymer electrolyte membrane was coated with the electrode catalyst ink such that the amount of platinum was 0.2 mg/cm$^2$ on the anode side and 0.3 mg/cm$^2$ on the cathode side, and the ink was dried and cured at 140° C. for five minutes to obtain an MEA.

(3) Production of Single Cell of Fuel Cell

A gas diffusion layer (trade name: GDL35BC, MFC Technology Inc.) was placed on each electrode of the MEA, and a gasket, bipolar plates, and backing plates were stacked to produce a single fuel cell.

(4) Power Generation Test

The single fuel cell was set in an evaluation device (fuel cell evaluation system 890CL, Toyo Corporation) and a power generation test was performed.

The conditions for the power generation test were as follows: the cell temperature was set to 80° C.; the temperature of the humidification bottle of the anode was set to 60° C.; the cathode was set under no humidification; and hydrogen gas was supplied to the anode side and air gas was supplied to the cathode side at a gas consumption rate at 0.3 A/cm$_2$ of 75% and 55%, respectively. Also, no pressure was applied (i.e. under atmospheric pressure) to both of the anode and cathode sides.

The voltage value (IV) at a current density of 0.5 A/cm$^2$ was measured under the above conditions.

(5) Load Change Test

The single fuel cell was set in an evaluation device (fuel cell evaluation system 890CL, Toyo Corporation), and a load change test was performed.

The conditions for the load change test were as follows: the cell temperature was set to 80° C.; the temperature of the humidification bottle of the anode was set to 70° C.; the temperature of the humidification bottle of the cathode was set to 70° C.; hydrogen gas was supplied to the anode side, and air gas was supplied to the cathode side; and the gases were supplied at a voltage cycle of 15 seconds at 0.8 V followed by 15 seconds at 0.5 V, where the gas flow rate at 0.8 V was anode/cathode=39/171 mL/min and the gas flow rate at 0.5 V was anode/cathode=156/685 mL/min. No pressure was applied (i.e. under atmospheric pressure) to both of the anode and cathode sides.

The difference in voltage value at 0.3 A/cm$^2$ between before the test and after 60,000-cycle voltage application under the above conditions was determined.

This test enables evaluation of power generation durability of an electrode binder.

Example 1

A high oxygen permeable ionomer was produced as follows which contained a repeating unit derived from $CF_2=CF-O-(CF_2)_2CF_3$ (C3VE), a repeating unit derived from $CF_2=CF-O-(CF_2)_2-SO_3H$ (N0SF), and a repeating unit derived from $CF_2=CF_2$ (TFE) in an amount of 12.5 mol %, 17.3 mol %, and 70.2 mol %, respectively, and had an EW of 876.

Previously, monomer mixture of $CF_2=CF-O-(CF_2)_2CF_3$ (370 g) and $CF_2=CF-O-(CF_2)_2-SO_2F$ (630 g) was prepared.

Reverse osmosis water (2,940 g), $C_7F_{15}COONH_4$ (60 g), and the monomer mixture (230 g) were placed in a pressure-resistant vessel which was made of stainless steel (SUS-316), had an inner capacity of 6 L, and was equipped with a stirring blade and a jacket for temperature control. The system was purged with nitrogen and then evacuated, and then TFE was introduced to the system until the internal pressure reached 0.10 MPaG. Under stirring at 400 rpm, the internal temperature of the system was controlled to 20° C. A solution of $(NH_4)_2S_2O_8$ (6 g) in water (20 g) was injected into the system, and then a solution of $Na_2SO_3$ (0.6 g) in water (20 g) was injected into the system to initiate polymerization. Subsequently, TFE was further added thereto such that the internal pressure was kept at 0.10 MPaG to continue the polymerization. The monomer mixture in an amount of 1.1 times the consumption of the TFE was continuously added to the system. The solution of $Na_2SO_3$ (0.6 g) in water (20 g) was further injected every hour.

At six hours from the initiation of the polymerization, in other words, at the point when the additionally introduced TFE amounted to 400 g, TFE was depressurized to terminate the polymerization, whereby 4,262 g of polymerization liquid (precursor emulsion) was obtained. The resulting precursor emulsion had a solids concentration of 19.5% by mass.

Then, 2.5 kg of water was added to a 2-kg portion of the resulting polymerization liquid, and nitric acid was added to the mixture to coagulate the polymer. After the coagulated polymer was filtered, redispersion of the residue in water followed by filtering was repeated three times. The residue was then dried with a hot-air dryer at 90° C. for 24 hours and then at 120° C. for 5 hours, whereby 213 g of a polymer (precursor polymer) was obtained. The polymer had a MFR of 88 g/10 min. The composition of the monomers was calculated from the measurement results by melt-state NMR.

The resulting precursor polymer was brought into contact with a solution of potassium hydroxide (15% by mass) and methyl alcohol (50% by mass) in water at 80° C. for 20 hours to be hydrolyzed. The resulting polymer was immersed in water at 60° C. for five hours. Subsequently, an immersion treatment of immersing the resulting polymer in 2N hydrochloric acid aqueous solution at 60° C. for one hour was repeated five times with renewal of the hydrochloric acid aqueous solution every time to allow protonation. The resulting polymer was washed with deionized water and then dried, whereby a fluoropolymer electrolyte was obtained.

The resulting fluoropolymer electrolyte and a solution of ethanol in water (water:ethanol=50.0:50.0 (by mass ratio)) were placed in a 5-L autoclave, and the autoclave was sealed. The temperature of the mixture was raised to 160° C. while stirring with a blade impeller, and the temperature was kept for five hours. Subsequently, the autoclave was naturally cooled, whereby a uniform fluoropolymer electrolyte solution with a solids concentration of 5% by mass was produced.

The resulting fluoropolymer electrolyte solution with a solids concentration 5% by mass was concentrated under reduced pressure at 80° C. to produce a solution of a high oxygen permeable ionomer which had a solids concentration of 20% by mass.

Synthesis Example 1

An emulsion solution of a high oxygen permeable ionomer was prepared as follows.

A 2-kg portion of the polymerization liquid (precursor emulsion) obtained in Example 1 was diluted 2-fold with pure water. The resulting mixture was stirred in a 10-L three-necked flask and the temperature was set to 80° C. Then, 10% by mass of a sodium hydroxide aqueous solution was added dropwise to the flask, and the —$SO_2F$ contained in the fluorine-containing polymer was hydrolyzed while keeping the pH of the mixture at 10 or higher. After about three hours, the decrease in pH stopped. The hydrolysis was further continued for two hours and then terminated.

Subsequently, dilute sulfuric acid was added to the mixture to adjust the pH to 8, and the mixture was ultrafiltrated with an ultrafiltration device from Millipore Corporation. The ultrafiltration membrane used was a membrane with a molecular weight cut-off of 10,000 (Pelican, 2 Filter, Millipore Corporation), and the membrane was introduced into a stainless steel holder from Millipore Corporation to prepare an ultrafiltration unit. The precursor emulsion obtained in Example 1 was hydrolyzed according to Synthesis Example 1, collected in a 10-L beaker, and supplied to the ultrafiltration unit through a feed pump (easy-load. Master Flex 1/P, Millipore Corporation). The filtrate including impurities was discharged outside the system and the processed liquid was returned to the beaker. The emulsion was ultrafiltrated while purified water in an amount corresponding to the amount of the removed filtrate was appropriately added to the beaker. The addition of pure water was terminated at the point when the electrical conductivity of the filtrate reached 10 $\mu S \cdot cm^{-1}$. The ultrafiltration was terminated at the point when the processed liquid amounted to 1 L, whereby an aqueous dispersion A was obtained. The electrical conductivity of the filtrate was measured with a conductance meter Twin. Cond B-173 from Horiba, Ltd. The ultrafiltration took five hours.

Example 2

A high oxygen permeable ionomer was produced as follows which contained a repeating unit derived from $CF_2$=CF—O—$(CF_2CF(CF)$—O$)_2$—$(CF_2)_3F$ [n2VE], a repeating unit derived from $CF_2$=CF—O—$(CF^2)_2$—$SO_3H$, and a repeating unit derived from $CF_2$=$CF_2$ in an amount of 6.3 mol %, 36.5 mol %, and 57.2 mol %, respectively, and had an EW of 538.

Reverse osmosis water (250 g), $C_3F_7$—O—CF($CF_3$)$CF_2$—O—CF($CF_3$) $COONH_4$ (25 g), $CF_2$=CF—O—$(CF_2CF(CF_3)$—O$)_2$—$(CF_2)_3F$ (38.45 g), and $CF_2$=CF—O—$(CF_2)_2$—$SO_2F$ (61.55 g) were placed in a pressure-resistant vessel which was made of stainless steel (SUS-316), had an inner capacity of 0.5 L, and was equipped with a stirring blade and a jacket for temperature control. The system was purged with nitrogen and then evacuated, and then TFE was introduced to the system until the internal pressure reached 0.12 MPaG. Under stirring at 550 rpm, the internal temperature of the system was controlled to 15° C. A solution of $(NH_4)_2S_2O_8$ (0.5 g) in water (5 g) was injected into the system, and then a solution of $Na_2SO_3$ (0.06 g) in water (7 g) was injected into the system to initiate polymerization. Subsequently, TFE was further added thereto such that the internal pressure was kept at 0.12 MPaG to continue the polymerization. The solution of $Na_2SO_3$ (0.06 g) in water (7 g) was further injected every hour.

At six hours from the initiation of the polymerization, in other words, at the point when the additionally introduced TFE amounted to 30 g, TFE was depressurized to terminate the polymerization, whereby 450 g of polymerization liquid (precursor emulsion) was obtained. The resulting precursor emulsion had a solids concentration of 23.0% by mass.

Then, 100 g of water was added to a 100-g portion of the resulting polymerization liquid, and nitric acid was added to the mixture to coagulate the mixture. After the coagulated polymer was filtered, redispersion of the residue in water followed by filtering was repeated three times. The residue was then dried with a hot-air dryer at 90° C. for 24 hours and then at 120° C. for 5 hours, whereby 22.0 g of a polymer (precursor polymer) was obtained. The polymer had a MFR of 28 g/10 min. The composition of the monomers was calculated from the measurement results by melt-state NMR.

The resulting polymer was subjected to hydrolysis, protonation, dissolution, and condensation in the same manner as in Example 1. Thereby, a solution of a high oxygen permeable ionomer with a solids concentration of 20% by mass was obtained.

Comparative Example 1

A comparative ionomer was produced as follows which contained a repeating unit derived from $CF_2$=CF—O—$(CF_2)_2$—$SO_3H$ and a repeating unit derived from $CF_2$=$CF_2$ in an amount of 18.5 mol % and 81.5 mol %, respectively, and had an EW of 719.

Reverse osmosis water (2,940 g), $C_7F_{15}COONH_4$ (60 g), and $CF_2$=CF—O—$(CF_2)_2$—$SO_2F$ (50 g) were placed in a pressure-resistant vessel which was made of stainless steel (SUS-316), had an inner capacity of 6 L, and was equipped with a stirring blade and a jacket for temperature control. The system was purged with nitrogen and then evacuated, and then TFE was introduced to the system until the internal pressure reached 0.70 MPaG. Under stirring at 500 rpm, the internal temperature of the system was controlled to 47° C. A solution of $(NH_4)_2S_2O_8$ (6 g) in water (20 g) was injected into the system to initiate polymerization. Subsequently, TFE was further added thereto such that the internal pressure was kept at 0.7 MPaG to continue the polymerization. $CF_2$=CF—O—$(CF_2)_2$—$SO_2F$ in an amount of 0.7 times the consumption of the TFE was continuously added to the system.

At five hours from the initiation of the polymerization, in other words, at the point when the additionally introduced TFE amounted to 800 g, TFE was depressurized to terminate the polymerization, whereby 4,701 g of polymerization liquid (precursor emulsion) was obtained. The resulting precursor emulsion had a solids concentration of 27.6% by mass.

Then, 250 g of water was added to a 200-g portion of the resulting polymerization liquid, and nitric acid was added to the mixture to coagulate the mixture. After the coagulated polymer was filtered, redispersion of the residue in water followed by filtering was repeated three times. The residue was then dried with a hot-air dryer at 90° C. for 24 hours and then at 120° C. for 5 hours, and fluorinated according to the process as described in Example 1 of WO 2005/028522A1, whereby 55.0 g of a polymer (precursor polymer) was obtained. The polymer had a MFR of 3.0 g/10 min. The composition of the monomers was calculated from the measurement results by melt-state NMR.

The resulting polymer was subjected to hydrolysis, protonation, dissolution, and condensation in the same manner as in Example 1. Thereby, an ionomer solution with a solids concentration of 20% by mass was obtained.

Comparative Example 2

A high oxygen permeable ionomer was produced as follows which contained a repeating unit derived from $CF_2=CF-O-(CF_2)_2CF_3$, a repeating unit derived from $CF_2=CF-O-(CF_2)_2-SO_3H$, and a repeating unit derived from $CF_2=CF_2$ in an amount of 15.2 mol %, 7.6 mol %, and 77.2 mol %, respectively, and had an EW of 1,826.

Previously, monomer mixture of $CF_2=CF-O-(CF_2)_2CF_3$ (646 g) and $CF_2=CF-O-(CF_2)_2-SO_2F$ (354 g) was prepared.

Reverse osmosis water (2,940 g), $C_7F_{15}COONH_4$ (60 g), and the monomer mixture (200 g) were placed in a pressure-resistant vessel which was made of stainless steel (SUS-316), had an inner capacity of 6 L, and was equipped with a stirring blade and a jacket for temperature control. The system was purged with nitrogen and then evacuated, and then TFE was introduced to the system until the internal pressure reached 0.26 MPaG. Under stirring at 500 rpm, the internal temperature of the system was controlled to 30° C. A solution of $(NH_4)_2S_2O_8$ (6 g) in water (20 g) was injected into the system, and then a solution of $Na_2SO_3$ (0.6 g) in water (20 g) was injected into the system to initiate polymerization. Subsequently, TFE was further added thereto such that the internal pressure was kept at 0.10 MPaG to continue the polymerization. The monomer mixture in an amount equivalent to the consumption of the TFE was continuously added to the system. The solution of $Na_2SO_3$ (0.6 g) in water (20 g) was further injected every hour.

At six hours from the initiation of the polymerization, in other words, at the point when the additionally introduced TFE amounted to 400 g, TFE was depressurized to terminate the polymerization, whereby 4,061 g of polymerization liquid (precursor emulsion) was obtained. The resulting precursor emulsion had a solids concentration of 11.4% by mass.

Then, 2.5 kg of water was added to a 2-kg of the resulting precursor emulsion, and nitric acid was added to the mixture to coagulate the mixture. After the coagulated polymer was filtered, redispersion of the residue in water followed by filtering was repeated three times. The residue was then dried with a hot-air dryer at 90° C. for 24 hours and then at 120° C. for 5 hours, whereby 220 g of a polymer (precursor polymer) was obtained. The polymer had a MFR of 61 g/10 min. The composition of the monomers was calculated from the measurement results by melt-state NMR.

The resulting polymer was subjected to hydrolysis, protonation, dissolution, and condensation in the same manner as in Example 1. Thereby, an ionomer solution with a solids concentration of 20% by mass was obtained.

Comparative Example 3

A high oxygen permeable ionomer was produced as follows which contained a repeating unit derived from $CF_2=CF-O-(CF_2)_2CF_3$, a repeating unit derived from $CF_2=CF-O-(CF_2)_2-SO_3H$, and a repeating unit derived from $CF_2=CF_2$ in an amount of 33.5 mol %, 12.5 mol %, and 54.0 mol %, respectively, and had an EW of 1,423.

Previously, monomer mixture of $CF_2=CF-O-(CF_2)_2CF_3$ (646 g) and $CF_2=CF-O-(CF_2)_2-SO_2F$ (354 g) was prepared.

Reverse osmosis water (2,940 g), $C_7F_{15}COONH_4$ (60 g), and the monomer mixture (200 g) were placed in a pressure-resistant vessel which was made of stainless steel (SUS-316), had an inner capacity of 6 L, and was equipped with a stirring blade and a jacket for temperature control. The system was purged with nitrogen and then evacuated, and then TEE was introduced to the system until the internal pressure reached 0.10 MPaG. Under stirring at 500 rpm, the internal temperature of the system was controlled to 15° C. A solution of $(NH_4)_2S_2O_8$ (6 g) in water (20 g) was injected into the system, and then a solution of $Na_2SO_3$ (0.6 g) in water (20 g) was injected into the system to initiate polymerization. Subsequently, TFE was further added thereto such that the internal pressure was kept at 0.10 MPaG to continue the polymerization. The monomer mixture in an amount of 2.2 times the consumption of the TFE was continuously added to the system. A solution of $Na_2SO_3$ (0.6 g) in water (20 g) was further injected every hour.

At five hours from the initiation of the polymerization, in other words, at the point when the additionally introduced TFE amounted to 200 g, TFE was depressurized to terminate the polymerization, whereby 4,103 g of polymerization liquid (precursor emulsion) was obtained. The resulting precursor emulsion had a solids concentration of 14.0% by mass.

Then, 250 g of water was added to a 200-g portion of the resulting polymerization liquid, and nitric acid was added to the mixture to coagulate the mixture. After the coagulated polymer was filtered, redispersion of the residue in water followed by filtering was repeated three times. The residue was then dried with a hot-air dryer at 90° C. for 24 hours and then at 120° C. for 5 hours, whereby 27.2 g of a polymer (precursor polymer) was obtained. The polymer had a MFR of 16 g/10 min. The composition of the monomers was calculated from the measurement results by melt-state NMR.

The resulting polymer was subjected to hydrolysis, protonation, dissolution, and condensation in the same manner as in Example 1. Thereby, an ionomer solution with a solids concentration of 20% by mass was obtained.

Example 3

A precursor polymer was obtained in the same manner as in Example 1, except that the composition of the monomer mixture consisted of C3VE (500 g) and N0SF (500 g) and the monomer mixture in an amount of 1.7 times the consumption of TFE was continuously added.

The resulting precursor polymer was subjected to hydrolysis, protonation, dissolution, and condensation in the same manner as in Example 1. Thereby, a solution of a high oxygen permeable ionomer with a solids concentration of 20% by mass was obtained.

Example 4

A precursor polymer was obtained in the same manner as in Example 1, except that the internal temperature was 15° C.

The resulting precursor polymer was subjected to hydrolysis, protonation, dissolution, and condensation in the same manner as in Example 1. Thereby, a solution of a high oxygen permeable ionomer with a solids concentration of 20% by mass was obtained.

Example 5

A precursor polymer was obtained in the same manner as in Comparative Example 3, except that the composition of the monomer mixture consisted of C3VE (268 g) and N0SF (732 g).

The resulting precursor polymer was subjected to hydrolysis, protonation, dissolution, and condensation in the same manner as in Example 1. Thereby, a solution of a high oxygen permeable ionomer with a solids concentration of 20% by mass was obtained.

Example 6

A precursor polymer was obtained in the same manner as in Example 2, except that C3VE (16.45 g) was used in place of $CF_2=CF-O-(CF_2CF(CF_3)_2-O)_2-(CF_2)_3F$ (n2VE) (38.45 g), the internal pressure was 0.07 MPaG, and the internal temperature was 10° C.

The resulting precursor polymer was subjected to hydrolysis, protonation, dissolution, and condensation in the same manner as in Example 1. Thereby, a solution of a high oxygen permeable ionomer with a solids concentration of 20% by mass was obtained.

Example 7

A high oxygen permeable ionomer was produced in the same manner as in Example 1 except that the amount of platinum in the cathode catalyst layer was 0.1 mg/cm$^2$ in the formation of an MEA.

Comparative Example 4

A precursor polymer was obtained in the same manner as in Comparative Example 2, except that the internal pressure was 0.13 MPaG, the internal temperature was 18° C., and the monomer mixture in an amount of 1.2 times the consumption of TFE was continuously added.

The resulting precursor polymer was subjected to hydrolysis, protonation, dissolution, and condensation in the same manner as in Example 1. Thereby, an ionomer solution with a solids concentration of 20% by mass was obtained.

Comparative Example 5

A precursor polymer was obtained in the same manner as in Example 2, except that the internal pressure was 0.20 MPaG and the internal temperature was 30° C.

The resulting precursor polymer was subjected to hydrolysis, protonation, dissolution, and condensation in the same manner as in Example 1. Thereby, an ionomer solution with a solids concentration of 20% by mass was obtained.

Comparative Example 6

A precursor polymer was obtained in the same manner as in Example 3, except that the composition of the monomer mixture consisted of C3VE (400 g) and N0SF (600 g) and the internal pressure was 0.07 MPaG.

The resulting precursor polymer was subjected to hydrolysis, protonation, dissolution, and condensation in the same manner as in Example 1. Thereby, an ionomer solution with a solids concentration of 20% by mass was obtained.

Comparative Example 7

$CF_2=CF-O-CF_2CF(CF_3)-O-CF_2CF_2-SO_2F$ (N1SF) (1.33 kg) and C3VE (0.47 kg) were placed in a 2-L stainless steel autoclave, and the system was purged with nitrogen, and then purged with tetrafluoroethylene (TFE: $CF_2=CF_2$). The temperature was set to 25° C., and the pressure of TFE was 0.645 MPa-G (gauge pressure). A 5% by weight solution (10 g) of $(n-C_3F_7COO-)_2$ in $CF_2=CF-O-CF_2CF(CF_3)-O-CF_2CF_2-SO_2F$ was added thereto to perform polymerization. The polymerization was performed for 30 minutes while TFE was intermittently fed from outside the polymerization vessel system and the pressure of TFE was decreased from 0.645 MPa-G at the initial point to 0.643 MPa-G at the terminal-point. The TFE in the polymerization vessel system was purged with nitrogen and the pressure was brought back to atmospheric pressure, whereby a dispersion of a precursor polymer in a monomer with a solids content of 8.4% by weight as a dispersion medium was obtained. To this dispersion was added methanol in an amount of three times the volume of the dispersion to precipitate a slurry, and the system was left to stand and the supernatant was removed. Then, washing with methanol/CFC113 (=1/2 (by volume ratio)) and removal of supernatant by leaving to stand were repeated three times. The resultant matter was dried under reduced pressure, at 110° C. for 16 hours to obtain 42 g of powder. The powder (precursor polymer in the form of perfect solid) had an equivalent weight of 952.

The resulting precursor polymer was subjected to hydrolysis, protonation, dissolution, and condensation in the same manner as in Example 1. Thereby, an ionomer solution with a solids concentration of 20% by mass was obtained.

(Measurement of Oxygen Permeability Coefficient)

The ionomer solutions obtained in Examples 1 to 7 and Comparative Examples 1 to 7 were cast into films with a thickness of 50 μm.

In addition, as a film of Comparative Example 8, a 50-μm-thick film was formed from a commercially available nafion solution (Nafion 1021, Sigma-Aldrich) in the same manner as in Example 1.

The oxygen permeability coefficient of each film was measured. Table 1 shows the results.

The results show that the ionomers having high oxygen permeability of the examples had better oxygen permeability coefficients compared to the ionomers of the comparative examples.

(Power Generation Test of Fuel Cell)

The ionomer solutions of the examples and the comparative examples were measured for the voltage value (IV) at a current density of 0.5 A/cm$^2$ in the above described manner.

Table 1 shows the results.

The results show that the ionomers having high oxygen permeability of the examples had higher voltage values and more excellent power generation performance compared to the ionomers of the comparative examples excluding Comparative Example 6.

The result of Example 7 shows that even when the amount of platinum used in the catalyst layer is small, the ionomer can exhibit high power generation performance.

Although the ionomer of Comparative Example 6 had high oxygen permeability and high power generation performance, the voltage difference in the load change test was as large as 0.05 V, which was 2.5 times the voltage difference of the ionomer of Example 2 having similar power generation performance (i.e. the power generation durability is 2.5 times or more poorer). This shows that the ionomer of Comparative Example 6 fails to achieve both of power generation performance and power generation durability.

(Load Change Test of Fuel Cell)

The ionomer solutions obtained in the examples and the comparative examples were measured for the difference in voltage value at 0.3 A/cm² between before the test and after 60,000-cycle voltage application.

Table 1 shows the results.

The results show that the ionomers having high oxygen permeability of the examples had higher voltage values and more excellent power generation durability compared to the ionomers of the comparative examples.

Thus, the ionomers of Examples 1 to 7 can achieve all of high oxygen permeability, power generation performance, and power generation durability under both low- and high-humidified conditions.

The invention claimed is:
1. An ionomer, comprising:
a repeating unit A;
a repeating unit B, and
a repeating unit C,
the ionomer having an equivalent weight of 250 to 930 and a glass transition temperature of 100° C. to 130° C.,
the amount of the repeating unit B is 16 to 45 mol %, relative to all the repeating units,
the repeating unit B being represented by the formula (2):

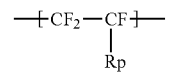

wherein Rp represents a monovalent group having a proton exchange group,
wherein the repeating unit A is at least one repeating unit selected from the group consisting of:
a repeating unit represented by the formula (3):

TABLE 1

| | Example 1 | Example 2 | Comparative Example 1 | Comparative Example 2 | Comparative Example 3 | Example 3 | Example 4 | Example 5 |
|---|---|---|---|---|---|---|---|---|
| TFE (mol %) | 70.2 | 57.2 | 81.5 | 77.2 | 54.0 | 61.0 | 71.4 | 65.0 |
| N0SF (mol %) | 17.3 | 36.5 | 18.5 | 7.6 | 12.5 | 19.0 | 16.1 | 26.0 |
| N1SF (mol %) | — | — | — | — | — | — | — | — |
| C3VE (mol %) | 12.5 | — | 0 | 15.2 | 33.5 | 20.0 | 12.5 | 9.0 |
| n2VE (mol %) | — | 6.3 | — | — | — | — | — | — |
| EW | 876 | 538 | 719 | 1826 | 1423 | 880 | 928 | 620 |
| A/B | 0.72 | 0.17 | — | 2.00 | 2.68 | 1.05 | 0.78 | 0.35 |
| MFR (g/10 min) | 88 | 28 | 3.0 | 61 | 16 | 48 | 23 | 19 |
| Tg (° C.) | 116 | 125 | 142 | 111 | 92 | 102 | 118 | 128 |
| Oxygen permeability coefficient (80° C. 30% RH/80° C. 90% RH) (cc · cm/(cm² · sec · cmHg) | $5.5 \times 10^{-9}/$ $6.3 \times 10^{-9}$ | $3.0 \times 10^{-9}/$ $6.0 \times 10^{-9}$ | $2.9 \times 10^{-9}/$ $3.4 \times 10^{-9}$ | $5.7 \times 10^{-9}/$ $1.5 \times 10^{-9}$ | $1.1 \times 10^{-8}/$ $3.3 \times 10^{-9}$ | $7.2 \times 10^{-9}/$ $1.1 \times 10^{-8}$ | $5.4 \times 10^{-9}/$ $6.1 \times 10^{-9}$ | $5.0 \times 10^{-9}/$ $5.1 \times 10^{-9}$ |
| Platinum amount in cathode catalyst layer (mg/cm²) | 0.3 | 0.3 | 0.3 | 0.3 | 0.3 | 0.3 | 0.3 | 0.3 |
| IV | 0.56 V | 0.61 V | 0.49 V | 0.40 V | 0.37 V | 0.63 V | 0.55 V | 0.59 V |
| Voltage defference between before and after load change test | 0.02 V | 0.02 V | 0.02 V | 0.02 V | 0.10 V | 0.02 V | 0.005 V | 0.01 V |

| | Example 6 | Comparative Example 4 | Comparative Example 5 | Comparative Example 6 | Comparative Example 7 | Comparative Example 8 | Example 7 |
|---|---|---|---|---|---|---|---|
| TFE (mol %) | 50.0 | 69.8 | 63.6 | 56.1 | 81.0 | — | 70.2 |
| N0SF (mol %) | 45.0 | 9.9 | 29.9 | 19.9 | — | — | 17.3 |
| N1SF (mol %) | — | — | — | — | 14.0 | — | — |
| C3VE (mol %) | 5.0 | 20.2 | — | 24.0 | 5.0 | 0 | 12.5 |
| n2VE (mol %) | — | — | 6.5 | — | — | — | — |
| EW | 419 | 1527 | 621 | 880 | 952 | 954 | 876 |
| A/B | 0.11 | 2.04 | 0.22 | 1.21 | 0.36 | — | 0.72 |
| MFR (g/10 min) | 45 | 23 | 20 | 50 | 50 | — | 88 |
| Tg (° C.) | 124 | 106 | 131 | 98 | 98 | 117 | 116 |
| Oxygen permeability coefficient (80° C. 30% RH/80° C. 90% RH) (cc · cm/(cm² · sec · cmHg) | $5.0 \times 10^{-9}/$ $6.9 \times 10^{-9}$ | $6.6 \times 10^{-9}/$ $1.8 \times 10^{-9}$ | $2.4 \times 10^{-9}/$ $4.6 \times 10^{-9}$ | $9.1 \times 10^{-9}/$ $1.3 \times 10^{-8}$ | $2.4 \times 10^{-9}/$ $3.8 \times 10^{-9}$ | $2.1 \times 10^{-9}/$ $3.3 \times 10^{-9}$ | $5.5 \times 10^{-9}/$ $6.3 \times 10^{-9}$ |
| Platinum amount in cathode catalyst layer (mg/cm²) | 0.3 | 0.3 | 0.3 | 0.3 | 0.3 | 0.3 | 0.1 |
| IV | 0.62 V | 0.35 V | 0.45 V | 0.65 V | 0.42 V | 0.31 V | 0.52 V |
| Voltage defference between before and after load change test | 0.02 V | 0.02 V | 0.01 V | 0.05 V | 0.04 V | 0.04 V | 0.02 V |

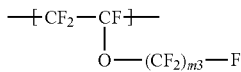

wherein $m^3$ represents an integer of 2 to 6; and
a repeating unit represented by the formula (4):

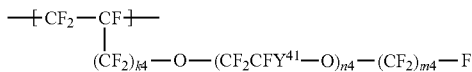

wherein $Y^{41}$ represents F or a C1-C3 perfluoroalkyl group; $k^4$ represents 0 or 1; $n^4$ represents an integer of 1 to 8; when $n^4$ represents an integer of 2 to 8, $Y^{41}$ in each of respective units —(CF$_2$CFY$^{41}$—O)$_{n4}$— may be the same as or different from each other; and $m^4$ represents an integer of 1 to 6,
wherein the repeating unit C that is at least one repeating unit selected from the group consisting of:
a repeating unit represented by the formula (7):

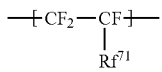

wherein $Rf^{71}$ represents F, Cl, or a C1-C9 linear or branched fluoroalkyl group, and
a repeating unit represented by the formula (8):

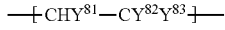

wherein $Y^{81}$ represents H or F; $Y^{82}$ represents F or a C1-C9 linear or branched fluoroalkyl group;
and $Y^{83}$ represents H, F, Cl, or a C1-C9 linear or branched fluoroalkyl group.

2. The ionomer according to claim 1,
wherein the repeating unit B is represented by the formula (5):

wherein $Y^{51}$ represents F, Cl, or a C1-C3 perfluoroalkyl group; $k^5$ represents an integer of 0 to 2; $n^5$ represents an integer of 0 to 8; when n5 represents an integer of 2 to 8, $Y^{51}$ in each of the respective units —(CF$_2$CFY$^{51}$—O)$_{n5}$— may be the same as or different from each other; $Y^{52}$ represents F or Cl; $m^5$ represents an integer of 2 to 6; $Y^{52}$s the number of which is $m^5$ may be the same as or different from each other; $Z^5$ represents H, an alkali metal, an alkaline-earth metal, or NR$^{51}$R$^{52}$R$^{53}$R$^{54}$; and R$^{51}$, R$^{52}$, R$^{53}$, and R$^{54}$ each independently represent a C1-C3 alkyl group or H.

3. The ionomer according to claim 1,
wherein the repeating unit B is represented by the formula (6):

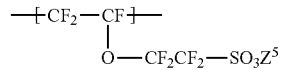

wherein $Z^5$ represents H, an alkali metal, an alkaline-earth metal, or NR$^{51}$R$^{52}$R$^{53}$R$^{54}$; and R$^{51}$, R$^{52}$, R$^{53}$, and R$^{54}$ each independently represent a C1-C3 alkyl group or H.

4. The ionomer according to claim 1,
wherein the ionomer contains 5 to 71 mol % of the repeating unit A relative to all the repeating units.

5. An emulsion comprising the ionomer according to claim 1, and water.

6. An ionomer solution comprising the ionomer according to claim 1, and water.

7. An electrode catalyst layer comprising the ionomer according to claim 1.

8. A membrane electrode assembly comprising the electrode catalyst layer according to claim 7.

9. A fuel cell comprising the membrane electrode assembly according to claim 8.

* * * * *